(12) United States Patent
Kober et al.

(10) Patent No.: US 9,434,238 B2
(45) Date of Patent: Sep. 6, 2016

(54) AIR DIFFUSER

(75) Inventors: Steve Kober, Treuen (DE); Marco Kuesperth, Wiesau (DE)

(73) Assignee: ITW Fastener Products GmbH, Iserlohn (DE)

( * ) Notice: Subject to any disclaimer, the term of this patent is extended or adjusted under 35 U.S.C. 154(b) by 726 days.

(21) Appl. No.: 13/808,679

(22) PCT Filed: Jul. 19, 2011

(86) PCT No.: PCT/EP2011/003613
§ 371 (c)(1),
(2), (4) Date: Mar. 20, 2013

(87) PCT Pub. No.: WO2012/013313
PCT Pub. Date: Feb. 2, 2012

(65) Prior Publication Data
US 2013/0210333 A1    Aug. 15, 2013

(30) Foreign Application Priority Data
Jul. 26, 2010  (DE) .................. 10 2010 032 233

(51) Int. Cl.
 *B60H 1/34*  (2006.01)
(52) U.S. Cl.
 CPC .......... *B60H 1/3435* (2013.01); *B60H 1/3442* (2013.01); *B60H 2001/3471* (2013.01)
(58) Field of Classification Search
 CPC .... B60H 1/3442; B60H 1/3435; B60H 1/34; B60H 2001/3471

USPC ......................................... 454/154, 152, 286
See application file for complete search history.

(56) References Cited

U.S. PATENT DOCUMENTS

| 2005/0239390 A1 | 10/2005 | Leopold |
| 2007/0066206 A1 | 3/2007 | Ono et al. |
| 2009/0081471 A1* | 3/2009 | Wilhelm et al. .............. 428/457 |
| 2010/0230627 A1* | 9/2010 | Jones ........................... 251/359 |

FOREIGN PATENT DOCUMENTS

| CN | 1919629 | 2/2007 |
| DE | 1 930 316 | 12/1965 |
| DE | 1930316 | 12/1965 |
| DE | 25 38 235 | 3/1977 |
| DE | 2538235 | 3/1977 |
| DE | 103 41 140 | 2/2005 |

(Continued)

*Primary Examiner* — Steven B McAllister
*Assistant Examiner* — Ko-Wei Lin
(74) *Attorney, Agent, or Firm* — Joseph M. Butscher; The Small Patent Law Group, LLC

(57) ABSTRACT

An air vent (10) having a housing (12) and an air guiding means (14) that is swivel-mounted in the housing (12) includes a mounting (24) by means of which the air guiding means (14) is mounted on the housing (12) for swiveling about at least one swivel axis, the mounting (24) being formed by a ball joint (30) having a bearing shell (34) and a ball head (32) mounted in the bearing shell (34), and the ball head (32) being of a multipart configuration with at least two spherical segments (50, 52), and a spring member (54) being provided that acts upon the spherical segments (50, 52) of the ball head (32) with a force that seeks to push the spherical segments (50, 52) apart.

18 Claims, 5 Drawing Sheets

(56) References Cited

FOREIGN PATENT DOCUMENTS

| DE | 10 2004 019 755 | 11/2005 |
|----|-----------------|---------|
| EP | 2 181 874 | 5/2010 |
| EP | 2181874 | 5/2010 |
| GB | 1 403 323 | 8/1975 |
| GB | 1403323 | 8/1975 |

\* cited by examiner

AIR DIFFUSER

RELATED APPLICATIONS

This application corresponds to PCT/EP2011, filed Jul. 19, 2011, which claims the benefit of German Application No. 10 2010 032 233.4, filed Jul. 26, 2010, the subject matter, of which are incorporated herein by reference in their entirety.

BACKGROUND OF THE INVENTION

The present invention relates to an air vent including a housing and an air guiding means that is swivel-mounted in the housing.

Various configurations of air vents are known from the prior art. They generally serve to adjust, in the desired manner, the volume and the direction of an air flow supplied to a vehicle interior for air conditioning. To this end, air vents have a mounting that allows a swiveling of the air guiding means in the housing. For example, a ball joint having a bearing shell and a ball head mounted in the bearing shell is commonly used for this purpose. In such a ball joint, the operating forces for swiveling the air guiding means and the holding forcing for the air guiding means may be adjusted using a clamping of the ball head in the bearing shell, i.e. the frictional resistance between the bearing shell and the ball head is adjusted by means of an appropriate pretension of the bearing shell around the ball head. Due to wear and age-related decline in the elasticity of the plastic materials used, the holding forces of such a ball joint may decrease in the course of time, which means that the holding forces of the air guiding means become increasingly smaller until the air guiding means no longer has sufficient hold in the housing to maintain a preset direction for the air flow. In an extreme case, a play may develop between the bearing shell and the ball head, which may result in an undesirable noise development in the vehicle.

SUMMARY OF THE INVENTION

The object of the invention is to provide an air vent which ensures unvaryingly high holding forces for the air guiding means over the entire service life.

To this end, provision is made according to the invention for an air vent including a housing and an air guiding means that is swivel-mounted in the housing, the air vent including a mounting by means of which the air guiding means is mounted on the housing for swiveling about at least one swivel axis. The mounting is formed by a ball joint having a bearing shell and a ball head mounted in the bearing shell. The ball head is of a multipart configuration with at least two spherical segments, and a spring member is provided that acts upon the spherical segments of the ball head with a force that seeks to push the spherical segments apart. The invention is based on the consideration of producing the friction between the bearing shell and the ball head by spreading the ball head apart, rather than by bracing the bearing shell on the ball head. For this purpose, the ball head is of a split design and a spring member is provided which pushes the preferably two spherical segments apart and thus against the bearing shell. The spring force of the spring member is here selected such that a sufficient force is exerted on the spherical segments even in the case of abrasion due to wear or a decrease in elasticity of the materials used, so that the spherical segments are pressed against the bearing shell. In this way, it is ensured over the entire useful life of the air vent that the air guiding means is mounted in the housing free of play and with a consistent holding force. In addition, a simple adaptation of the operating forces for adjusting the air guiding means is possible by an appropriate selection of the spring member.

In a preferred embodiment, the ball head is provided on the housing and the bearing shell is provided on the air guiding means. That is, the air guiding means can be designed in a simple manner without any additional moving parts, whereas the ball head with the spring is installed in the housing. No design changes need to be made to the air guiding means and thus to the bearing shell, so that it is possible to continue to use the air guiding means used hitherto without any changes.

In this embodiment, for example, a first spherical segment of the ball head is connected so as to be non-rotatable relative to the housing, and the second spherical segment is mounted on the first spherical half for displacement in a direction perpendicular to the cutting plane of the two spherical segments. The first spherical segment thus constitutes a fixed bearing, which also defines the position of the air guiding means in relation to the housing. The second spherical segment is mounted for displacement relative to the first spherical segment, so that it can compensate for any play occurring in the ball joint.

For mounting the second spherical segment at the first spherical segment, a central recess is provided for example on the side of the first spherical segment facing the second spherical segment, the central recess extending away from the second spherical segment. The second spherical segment includes a projection which extends into the recess. This provides a simple mounting of the two spherical segments, which allows a linear displacement of both spherical segments in relation to each other.

The spring member may be arranged in the recess, for example, and act upon the second spherical segment with a force directed away from the first spherical segment. The spring member is held in the recess captively and so as to be protected from dust or soiling, and acts constantly on both spherical segments.

A fastening projection may be provided on the first spherical segment to fasten the ball head in the housing. To provide sufficient space for the spring, for example for a coil spring, the recess may extend as far as into the fastening projection. For one thing, this can provide sufficient space for a spring. For another thing, by providing a projection of appropriate length of the second spherical segment, the mounting of the two spherical segments in relation to each other can be configured more safely so that, for example, any jamming of the projection in the recess is prevented.

To allow a simple assembly and disassembly of the ball joint, the bearing shell is preferably of an annular design and includes two annular bearing shell components. The bearing shell components are manufactured separately and assembled around the ball head of the ball joint.

In order to allow the ball head to be mounted free of play in the bearing shell and thus the air guiding means to be mounted free of play, provision is made that the bearing shell has a coating consisting of a soft material, in particular of a flexibly resilient plastic material. Such a material has a higher frictional resistance than a hard plastic material, so that the operating forces of the air vent can be adjusted better. In addition, such a material can yield flexibly, as a result of which any play can be better compensated for.

The coating is preferably injection-molded on the respective bearing shell, so that it constitutes a unit jointly with the bearing shell.

The bearing shell is preferably in the form of a separate component, so that it can be exchanged separately in case of too high a wear.

The mounting according to the invention involving a ball joint allows a swiveling in several directions. To make use of this, the air guiding means may, for example, have an outer surface that is generally in the shape of a spherical segment, and may be mounted in the housing for swiveling and turning motion.

In this embodiment, the center of the air guiding means corresponds to the pivotal point of the ball joint, so that the air guiding means can be swiveled about the ball joint on a spherical surface. This makes it possible to use the spherical outer surface of the air guiding means directly for sealing in the housing since the outer surface is concentric with the pivotal point of the bearing.

BRIEF DESCRIPTION OF THE DRAWINGS

Further advantages and features will be apparent from the description below in conjunction with the accompanying drawings, in which.

DESCRIPTION OF EXEMPLARY EMBODIMENT

Figure 1:
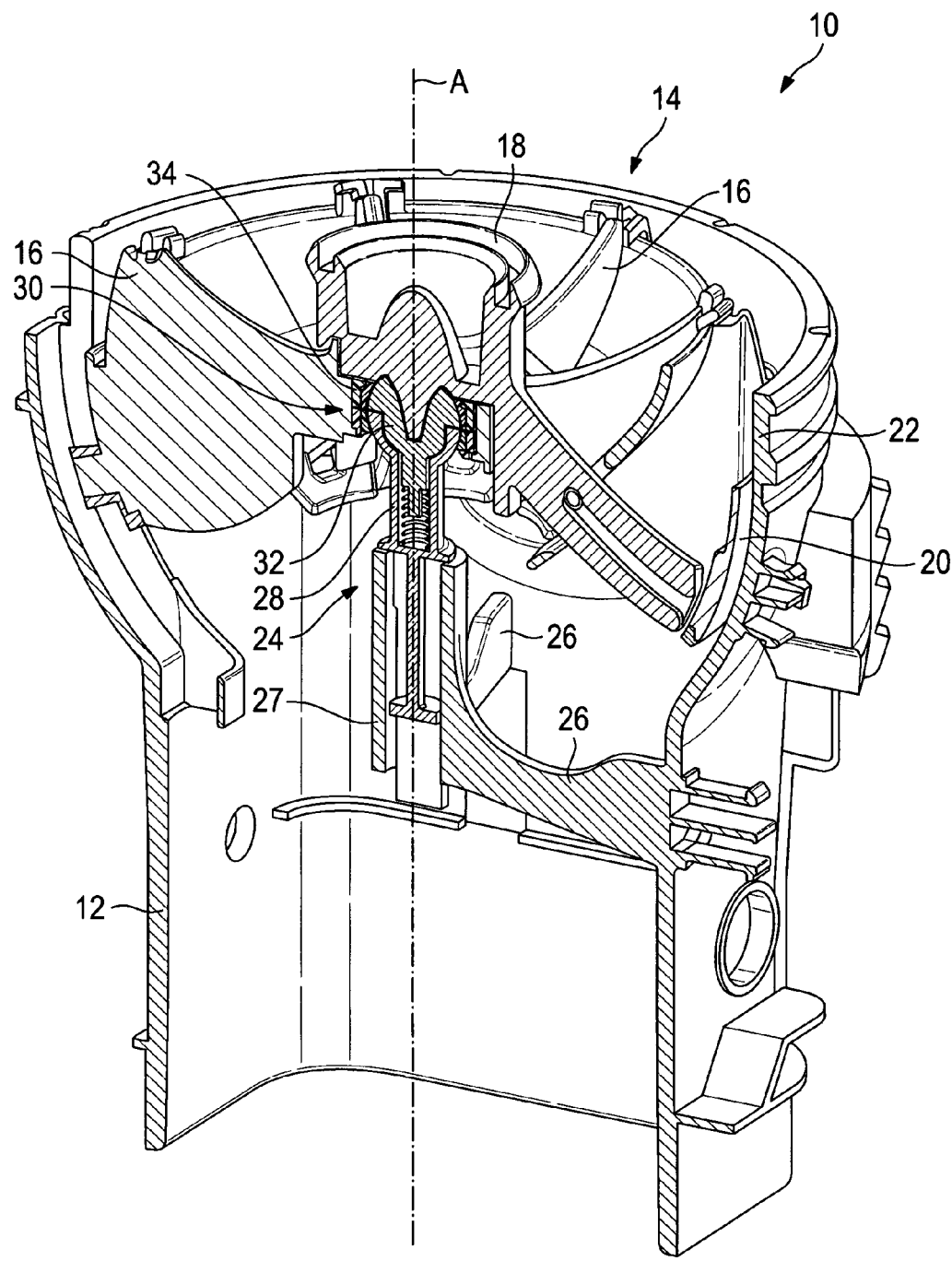
FIG. 1 shows a perspective sectional view of an air vent according to the invention.
Figure 2:
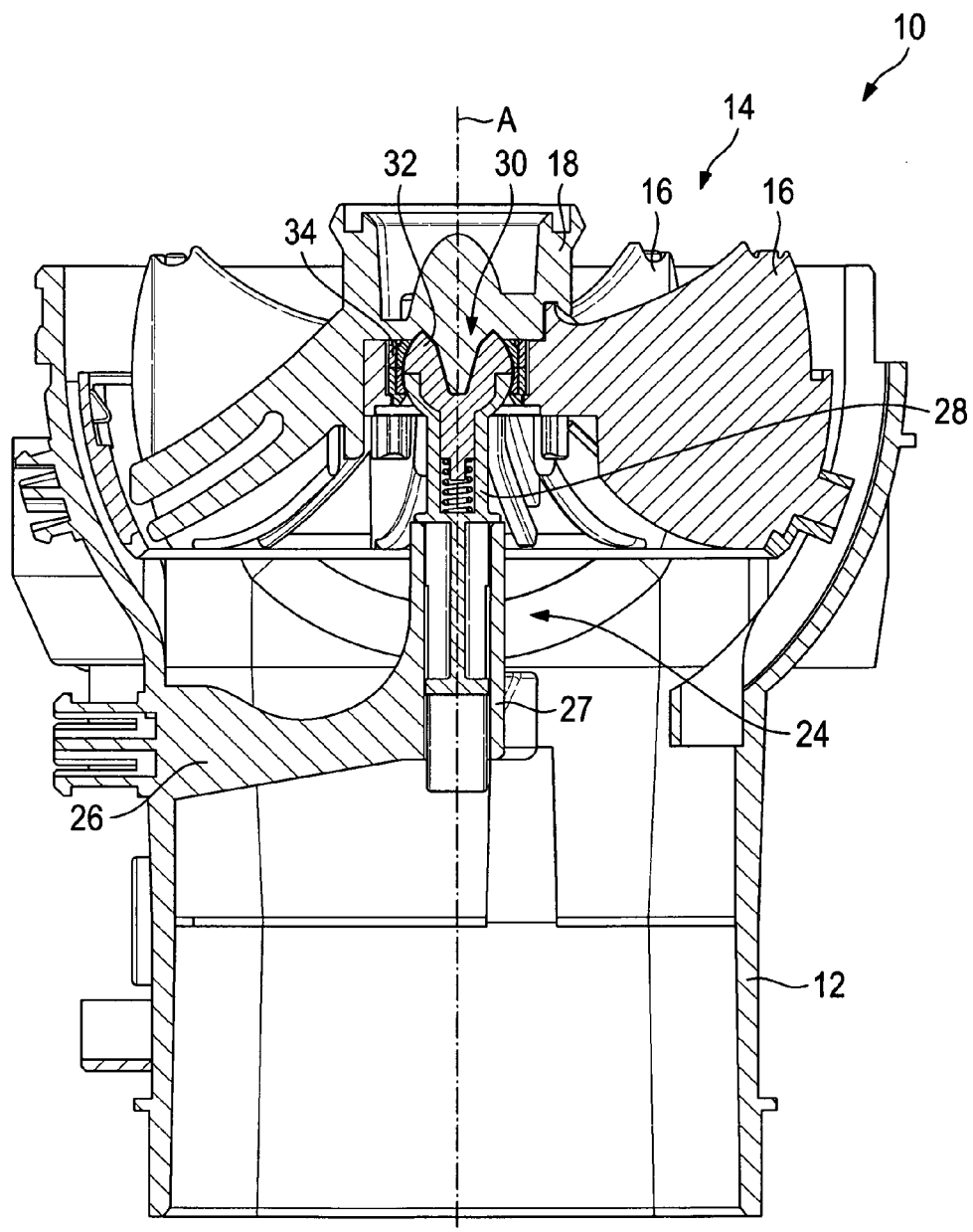
FIG. 2 shows a sectional view of the air vent from FIG. 1.

The air vent 10 shown in FIGS. 1 and 2 includes a housing 12 in which an air guiding means 14 is mounted for swiveling motion relative to a longitudinal axis A of the air vent 10. The air guiding means 14 has a plurality of adjustable vanes 16 and a centrally disposed operating element 18. The adjustment of the vanes 16 and the functioning of the operating element 18 are known from the prior art, so that they will not be discussed in more detail. The air guiding means 14 has a substantially spherical segment-shaped outer surface 20 arranged in a section 22, of a substantially hemispherical configuration, of the housing 12.

The air guiding means 14 is mounted here by a mounting 24 for turning and swiveling motion in the housing 12 of the air vent 10. The mounting 24 includes a plurality of fastening arms 26 having a seat 27 provided thereon which is arranged on the longitudinal axis A and into which a fastening projection 28 can be inserted contrary to the direction of the longitudinal axis A. Provided on the fastening projection 28 is a ball joint 30 having a pivotal point disposed in the center of the air guiding means.

Figure 3:
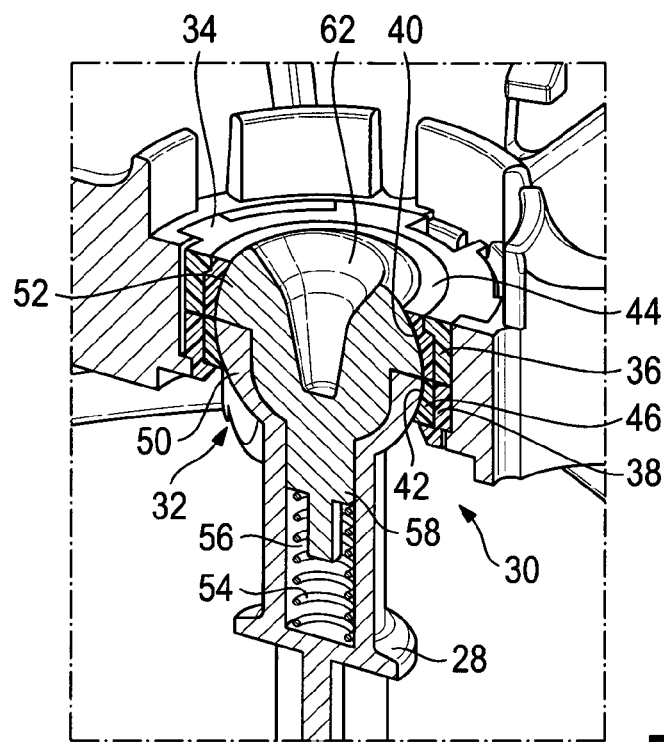
FIG. 3 shows a detail view of the mounting of the air vent from FIG. 1.

As can be seen in particular in FIG. 3, the ball joint 30 has a ball head 32 fastened to the fastening projection 28 and a bearing shell 34 coupled to the air guiding means 14. The bearing shell 34 consists of two annular bearing shell components 36, 38, which are provided with a coating 44, 46. The coatings 44, 46 are made of a flexibly resilient plastic material which, for example, is injection-molded on the bearing shell components 36, 38. The coatings each include a sliding surface 40, 42 that is in the shape of a hemispherical segment and rests against the ball head 32. But embodiments without a coating 44, 46 are also conceivable. In that case the sliding surfaces 40, 42 would be provided directly on the bearing shell components 36, 38.

The ball head 32 includes two spherical segments 50, 52 dividing the ball head 32 here in a plane perpendicular to the longitudinal axis A. The first spherical segment 50, which is the lower one with respect to FIG. 3, is firmly connected with the fastening projection 28 whereas the second, upper spherical segment 52 is mounted on the first spherical segment 50 for displacement in the direction of the longitudinal axis A, as will be described below. In the exemplary embodiment shown, the ball head is divided along its equator. It is basically also possible to divide the spherical segment at another location. For example, a parting line may be used which runs in the nature of castle battlements, so that the two spherical segments engage into each other and are guided one on the other. It is basically also possible to use more than two spherical segments.

Here, the second spherical segment 52 is mounted on the first spherical segment 50 by means of a recess 56 which is provided on the side of the first spherical segment 50 facing the second spherical segment 52 and into which a corresponding projection 58 of the second spherical segment 52 extends. The recess 56 and the projection 58 extend in the direction of the longitudinal axis A, so that the second spherical segment 52 is mounted on the first spherical segment 50 for displacement in the direction of the longitudinal axis A.

A pretensioned spring member 54, constituted by a coil spring here, is provided in the recess 56, the spring member acting upon the projection 58 with a force directed in the direction of the longitudinal axis A so that the first spherical segment 50 and the second spherical segment 52 are pushed apart in the direction of the longitudinal axis A. "Pushed apart" means that the spring attempts to displace the two spherical segments in such a way that their outer dimensions, as measured parallel to the direction of displacement, become larger.

The second spherical segment 52 is pushed in the direction of the longitudinal axis A by the spring member 54 until it rests against the sliding surface 40 of the first bearing shell component 36. The spherical segments 52 and 50 are pushed further apart by the spring force of the spring member 54, so that the first spherical segment 50 rests against the sliding surface 42 of the second bearing shell component 38. That is, the two-part ball head 32 is spread apart in the bearing shell 34, so that the ball head rests against the bearing shell 34 by both spherical segments 50, 52 free of play and is pressed against it. Owing to the frictional forces between the ball head 32 and the bearing shell 34 or the sliding surfaces 40, 42, the air guiding means 14 is securely held in its respectively set position.

Setting the holding forces of the ball joint 30 and the operating forces for adjusting the angle of the air guiding means 14 may be effected by means of an appropriate selection of the spring member 54. When greater holding forces are desired, a correspondingly harder spring member 54 may be employed.

In the case of wear of the bearing shell 34 or an abrasion of the sliding surfaces 40, 42, the spring member 54 causes the spherical segments 50, 52 to follow, i.e. the spherical segments continue to be pressed constantly against the sliding surfaces 40, 42 of the bearing shell 34. In this way, a mounting free of play of the air guiding means 14 on the ball joint 30 is ensured even in the case of use-related abrasions or wear of the bearing shell 34. In practice, this involves readjustments in the range of micrometers or of tenths of millimeters at most.

The recess 56 here extends through the first spherical segment 50 as far as into the fastening projection 28. For one thing, this provides sufficient structural space for the spring member 54; for another thing, a correspondingly longer configuration of the projection 58 of the second spherical segment 52 ensures a secure mounting of the spherical segments 50, 52 in relation to each other.

Figure 4:
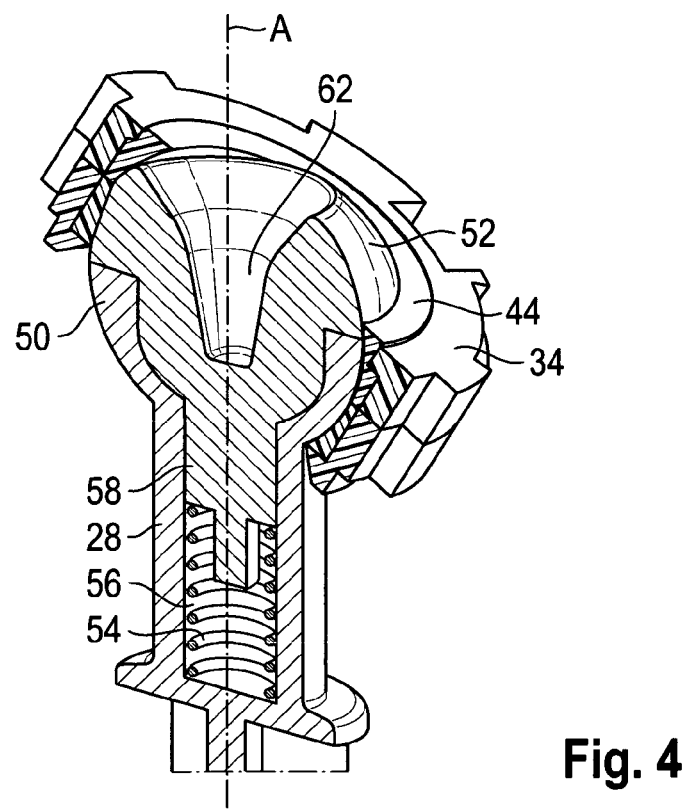
FIG. 4 shows a detail view of the ball joint of the air vent from FIG. 1.
Figure 5:
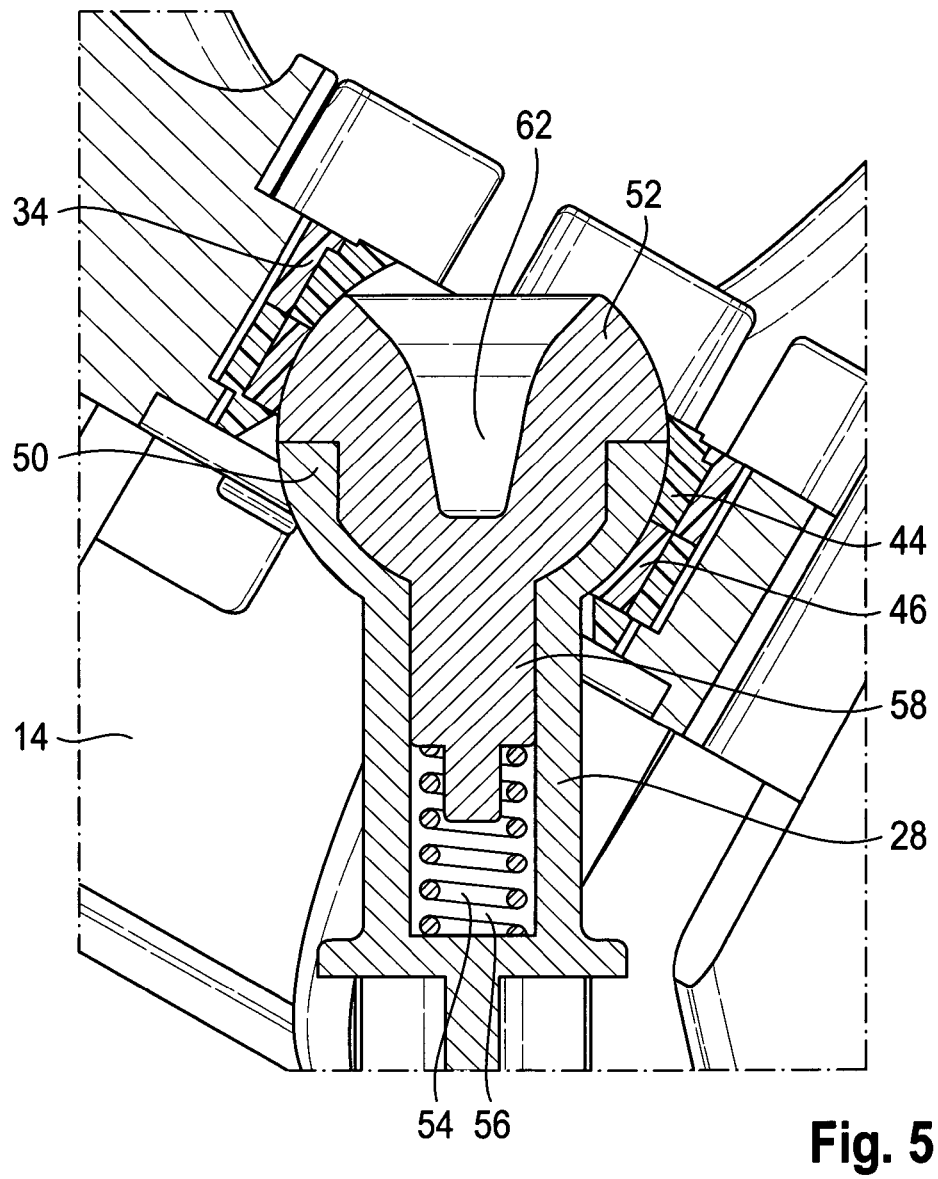
FIG. 5 shows a view of a section taken through the ball joint from FIG. 4, in a swiveled condition.

As is illustrated in FIGS. 4 and 5, which show the ball joint 30 in a swiveled condition, both the first spherical segment 50 and the second spherical segment 52 are always partly in contact with the bearing shell 34 even in a fully swiveled condition of the ball joint. This means that the mounting free of play is ensured irrespectively of the swivel angle of the ball joint 30, that is, the air guiding means 14. In this context, the bearing shell 34 should be selected such that it ensures sufficient hold even when the ball joint 30 is in a fully swiveled condition.

Figure 6:
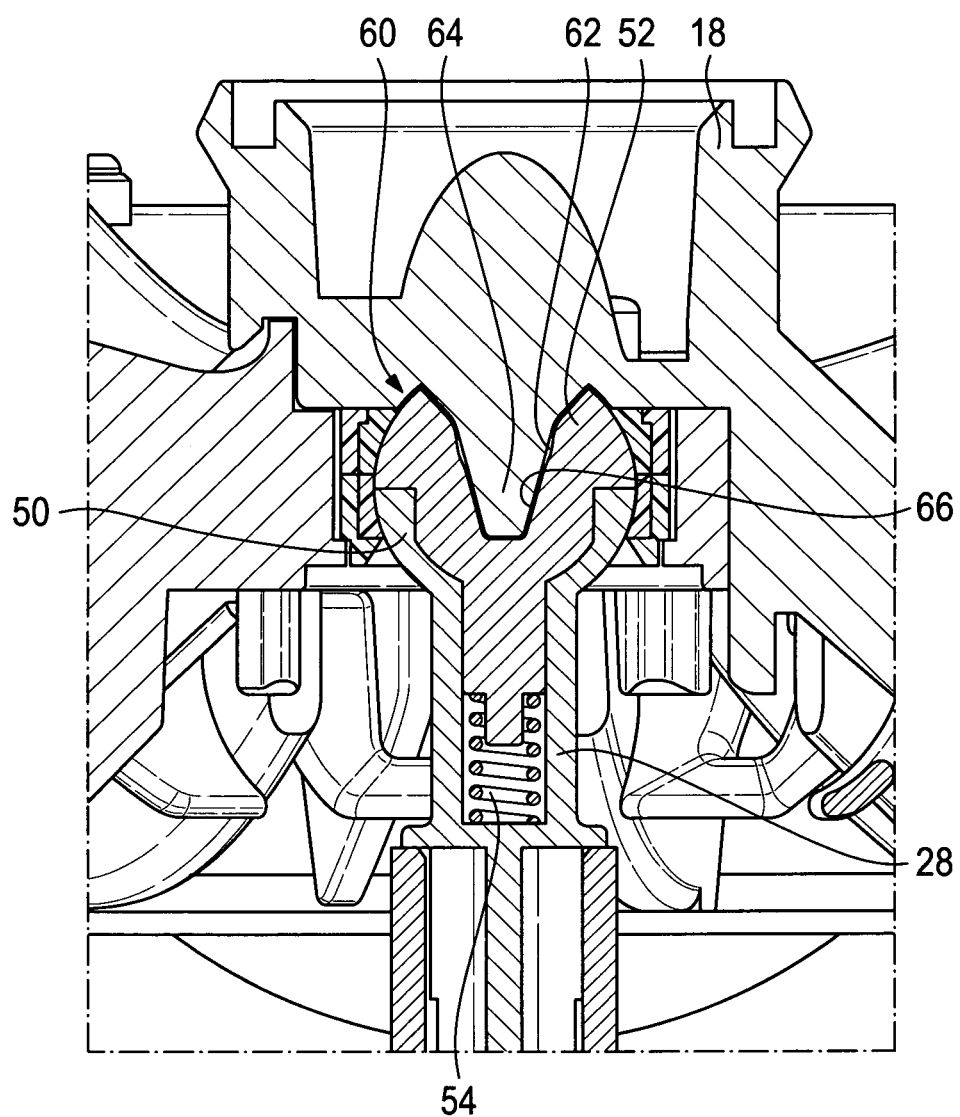
FIG. 6 shows a detail view of a section taken through the air vent from FIG. 1.

As can be seen in FIG. 6, the mounting 24 further includes a stop 60 that delimits the swivel angle of the ball joint. Swiveling the ball joint 30 too far could result in that the bearing shell 34 comes into contact with the fastening projection 28 and upon further swiveling a damage to the bearing shell 34 or to the ball head 32 might ensue due to the lever relationships.

The stop 60 is formed here by a conical recess 62 that is provided on the ball head 32. A projection 64, which is coupled to the operating element 18 here, protrudes into this conical recess 62. The operating element 18, which is coupled to the air guiding means 14, can be swiveled so far until the projection 64 rests against the conical surface 66 of the conical recess 62. The present illustration only provides a schematic illustration of such a stop 60. The conical surface 66 is preferably selected such that it allows the ball joint 30 to be swiveled through an angle on the order of a maximum of 30 degrees.

In addition, the bearing shell 34 is in the form of a separate component which, for assembly, is inserted into the air guiding means 14 against the direction of the longitudinal axis A.

The invention claimed is:

1. An air vent (10) comprising a housing (12) and an air guiding means (14) that is swivel-mounted in the housing (12),
    the air vent (10) including a mounting (24) by means of which the air guiding means (14) is mounted on the housing (12) for swiveling about at least one swivel axis,
    the mounting (24) being formed by a ball joint (30) having a bearing shell (34) and a ball head (32) mounted in the bearing shell (34), and
    the ball head (32) being of a multipart configuration with at least two spherical segments (50, 52), and a spring member (54) being provided that acts upon the spherical segments (50, 52) of the ball head (32) with a force that seeks to push the spherical segments (50, 52) apart, the at least two spherical segments remaining substantially stationary relative to the housing when the air guiding means swivels about the at least one swivel axis.

2. The air vent according to claim 1, wherein the ball head (32) is provided on the housing (12) and the bearing shell (34) is provided on the air guiding means (14).

3. The air vent according to claim 1, wherein the bearing shell (34) is of an annular design and includes two annular bearing shell components (36, 38).

4. The air vent according to claim 1, wherein the bearing shell (34) has a coating (44, 46) consisting of a soft material, in particular of a flexibly resilient plastic material.

5. The air vent according to claim 4, wherein the coating (44, 46) is injection-molded on the bearing shell (34).

6. The air vent according to claim 1, wherein the bearing shell (34) is a separate component.

7. The air vent according to claim 1, wherein air guiding means (14) has an outer surface (20) that is generally in the shape of a spherical segment, and is mounted in the housing (12) for swiveling and turning motion.

8. The air vent according to claim 7, wherein the center of the air guiding means (14) corresponds to the pivotal point of the ball joint (30).

9. The air vent according to claim 1, wherein a second spherical segment of the at least two spherical segments is mounted on a first spherical segment of the at least two spherical segments.

10. An air vent (10) comprising a housing (12) and an air guiding means (14) that is swivel-mounted in the housing (12),
    the air vent (10) including a mounting (24) by means of which the air guiding means (14) is mounted on the housing (12) for swiveling about at least one swivel axis,
    the mounting (24) being formed by a ball joint (30) having a bearing shell (34) and a ball head (32) mounted in the bearing shell (34), and
    the ball head (32) being of a multipart configuration with at least two spherical segments (50, 52), and a spring member (54) being provided that acts upon the spherical segments (50, 52) of the ball head (32) with a force that seeks to push the spherical segments (50, 52) apart,
    wherein the ball head (32) is provided on the housing (12) and the bearing shell (34) is provided on the air guiding means (14), and
    wherein a first spherical segment (50) of the ball head (32) is connected so as to be non-rotatable relative to the housing (12), and the second spherical segment (52) is mounted on the first spherical segment (50) for displacement in a direction perpendicular to an equator of the ball head.

11. The air vent according to claim 10, wherein a central recess (56) is provided on the side of the first spherical segment (50) facing the second spherical segment (52), the recess extending away from the second spherical segment (52), and that the second spherical segment (52) includes a projection (58) which extends into the recess (56) of the first spherical segment (50).

12. The air vent according to claim 11, wherein the spring member (54) is arranged in the recess (56) and acts upon the second spherical segment (52) with a force directed away from the first spherical segment (50).

13. The air vent according to claim 11, wherein a fastening projection (28) is provided on the first spherical segment (50) and the recess (56) extends as far as into the fastening projection (28).

14. An air vent (10) comprising a housing (12) and an air guiding means (14) that is swivel-mounted in the housing (12),
    the air vent (10) including a mounting (24) by means of which the air guiding means (14) is mounted on the housing (12) for swiveling about at least one swivel axis,
    the mounting (24) being formed by a ball joint (30) having a bearing shell (34) and a ball head (32) mounted in the bearing shell (34), and
    the ball head (32) being of a multipart configuration with at least two spherical segments (50, 52), and a spring member (54) being provided that acts upon the spherical segments (50, 52) of the ball head (32) with a force that seeks to push the spherical segments (50, 52) apart, the at least two spherical segments are being always at least partly in contact with the bearing shell.

15. An air vent comprising:
    a housing;
    air guiding means mounted to the housing for movement relative to a longitudinal axis of the air vent;
    a ball joint that mounts the air guiding means to the housing, the ball joint including a bearing shell and a multipart ball head engaging in the bearing shell and having two spherical segments, the two spherical segments defining an outer surface of the ball head and always being at least partly in contact with the bearing shell; and
    a spring member acting upon the spherical segments to move the spherical segments away from one another in a direction along the longitudinal axis of the air vent.

16. The air vent according to claim 15, wherein a central recess is provided on a side of the first spherical segment facing the second spherical segment, the second spherical segment including a projection that extends into the recess, the spring member being located in the recess.

17. The air vent according to claim 15, wherein the bearing shell is annular and includes two annular bearing shell components.

18. The air vent according to claim 15, wherein a center of the air guiding means corresponds to a pivot point of the ball joint.

* * * * *